(12) United States Patent
Shen

(10) Patent No.: US 10,396,499 B1
(45) Date of Patent: Aug. 27, 2019

(54) ELECTRIC CONNECTOR

(71) Applicant: SURE-FIRE ELECTRICAL CORPORATION, New Taipei (TW)

(72) Inventor: Chun-Lai Shen, New Taipei (TW)

(73) Assignee: Sure-Fire Electrical Corporation, New Taipei (TW)

(*) Notice: Subject to any disclaimer, the term of this patent is extended or adjusted under 35 U.S.C. 154(b) by 0 days.

(21) Appl. No.: 16/114,436

(22) Filed: Aug. 28, 2018

(51) Int. Cl.
| | |
|---|---|
| *H01R 4/66* | (2006.01) |
| *H01R 13/6471* | (2011.01) |
| *H01R 13/6594* | (2011.01) |
| *H01R 13/11* | (2006.01) |
| *H01R 13/504* | (2006.01) |
| *H01R 13/6585* | (2011.01) |
| *H01R 4/28* | (2006.01) |
| *H01R 107/00* | (2006.01) |
| *H01R 24/62* | (2011.01) |
| *H04N 21/4363* | (2011.01) |
| *H01R 13/66* | (2006.01) |

(52) U.S. Cl.
CPC ........... *H01R 13/6471* (2013.01); *H01R 4/28* (2013.01); *H01R 13/11* (2013.01); *H01R 13/504* (2013.01); *H01R 13/6585* (2013.01); *H01R 13/6594* (2013.01); *H01R 13/6658* (2013.01); *H01R 24/62* (2013.01); *H01R 2107/00* (2013.01); *H04N 21/43635* (2013.01)

(58) Field of Classification Search
CPC ...... H01R 4/28; H01R 13/6471; H01R 13/11; H01R 13/504; H01R 13/6585; H01R 13/6594; H01R 13/6658; H01R 24/62; H01R 2107/00; H04N 21/43635

USPC .................................. 439/78, 83, 108, 660
See application file for complete search history.

(56) References Cited

U.S. PATENT DOCUMENTS

| | | | | |
|---|---|---|---|---|
| 8,545,240 B2* | 10/2013 | Casher | ................... | H01R 29/00 439/108 |
| 8,721,353 B2* | 5/2014 | Xu | ......................... | H01R 27/02 439/108 |
| 8,864,506 B2* | 10/2014 | Little | ................... | H01R 13/658 439/108 |
| 8,894,445 B2* | 11/2014 | Jol | ......................... | H01R 24/62 439/108 |
| 8,905,792 B2* | 12/2014 | Scritzky | ............. | H01R 13/6595 439/108 |

* cited by examiner

*Primary Examiner* — Khiem M Nguyen (74) *Attorney, Agent, or Firm* — Rosenberg, Klein & Lee (57) ABSTRACT

An electric connector includes an insulating body which includes terminal slots formed in an abutting chamber inside thereof, and the abutting part includes two arms extended from two opposite rear sides thereof in the same direction, and an accommodation space formed between the two arms; and, a terminal holder integrally formed with the conductive terminals of the terminal set is combined between the two arms, and each conductive terminal has a predetermined length, and includes a contact part inserted through the terminal slot and into the abutting chamber, a solder part disposed behind the contact part and exposed to the accommodation space, and a terminal arm with a given length formed between the contact part and the solder part. The length of the solder part is lower than the length of each arm. The solder parts can be electrically connected to an abutting side of a signal transmission part.

10 Claims, 10 Drawing Sheets

ELECTRIC CONNECTOR

BACKGROUND OF THE INVENTION

1. Field of the Invention

The present invention relates to an electric connector, more particularly to an electric connector having shorter terminals which can be assembled with an insulating body easily, and each terminal of the electric connector includes a contact part, a solder part, and a terminal arm with a given length formed between the contact part and the solder part, so when the length of the solder part is effectively reduced, the length of the insulating body can be reduced to facilitate assembly of the insulating body, thereby achieving the purpose of decreasing the resistance of the terminal set and preventing the terminal set from being deformed easily during the manufacturing process, and also meeting the concept of designing lighter, thinner, shorter, and smaller electronic product.

2. Description of the Related Art

With rapid development of electronic technology, the higher resolution of display devices (such as monitors or TVs) and the requirement in the high transmission bandwidth cause the traditional VGA interfaces to be replaced by DVI interfaces and Display Port digital video interfaces. Furthermore, in order to display clearer images and provide higher transmission bandwidth, some related interface standards are continuously developed and updated. As a result, a high-resolution multimedia interface (HDMI) is developed. The HDMI is a fully digitalized image and audio transmission interface, and able to transmit uncompressed audio and video signals and ensure that audio and video are transmitted without attenuation, and is commonly used for audio and video transmission in consumer electronics, such as TV, computer, player, game console, integrated amplifier and digital audio.

Furthermore, in recent years, as high-definition images gradually become mainstream video standards, and the video standards are progressed from FHD standards with resolution of 1920×1080 to the UHD standards with resolution of 4K2K (3840×2160), and display devices that support 4K display technology are becoming more and more popular. The data transmission bandwidth defined in conventional standards may not meet the functional requirements of the future video transmission interface, so the new HDMI 2.1 specification is developed to define the transmission bandwidth increased from 18 Gbps of HDMI 2.0 to 48 Gbps, and support a variety of motion pictures with more pixels and update rate such as 4K/120 Hz or 8K/60 Hz, even up to 10K/120 Hz in cooperation with compression technology. Besides the greatly improved transmission bandwidth, the HDMI 2.1 specification also applies dynamic HDR function and low-latency transmission technology, and is compatible with the HDMI 2.0 specifications. Furthermore, the HDMI 2.1 specification supporting the resolution up to 10K pixels can be applied to commercial, industrial, and other professional purpose.

Figure 9:
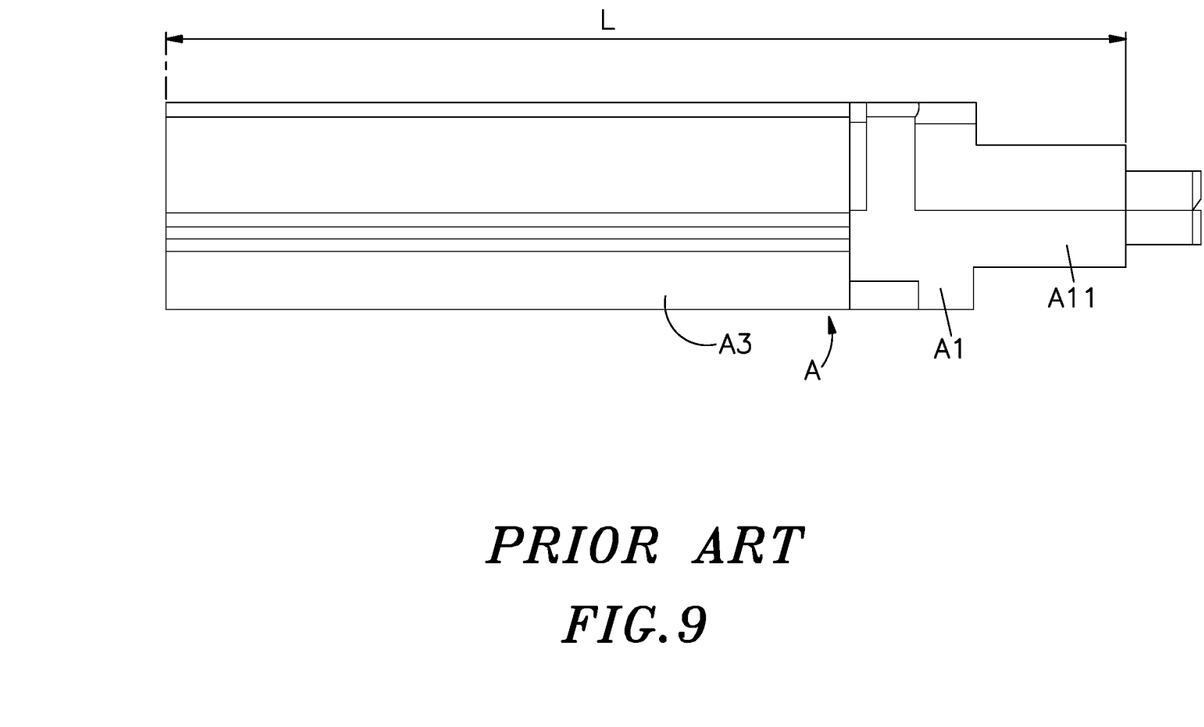
FIG. 9, is a side view of a conventional electric connector.
Figure 10:
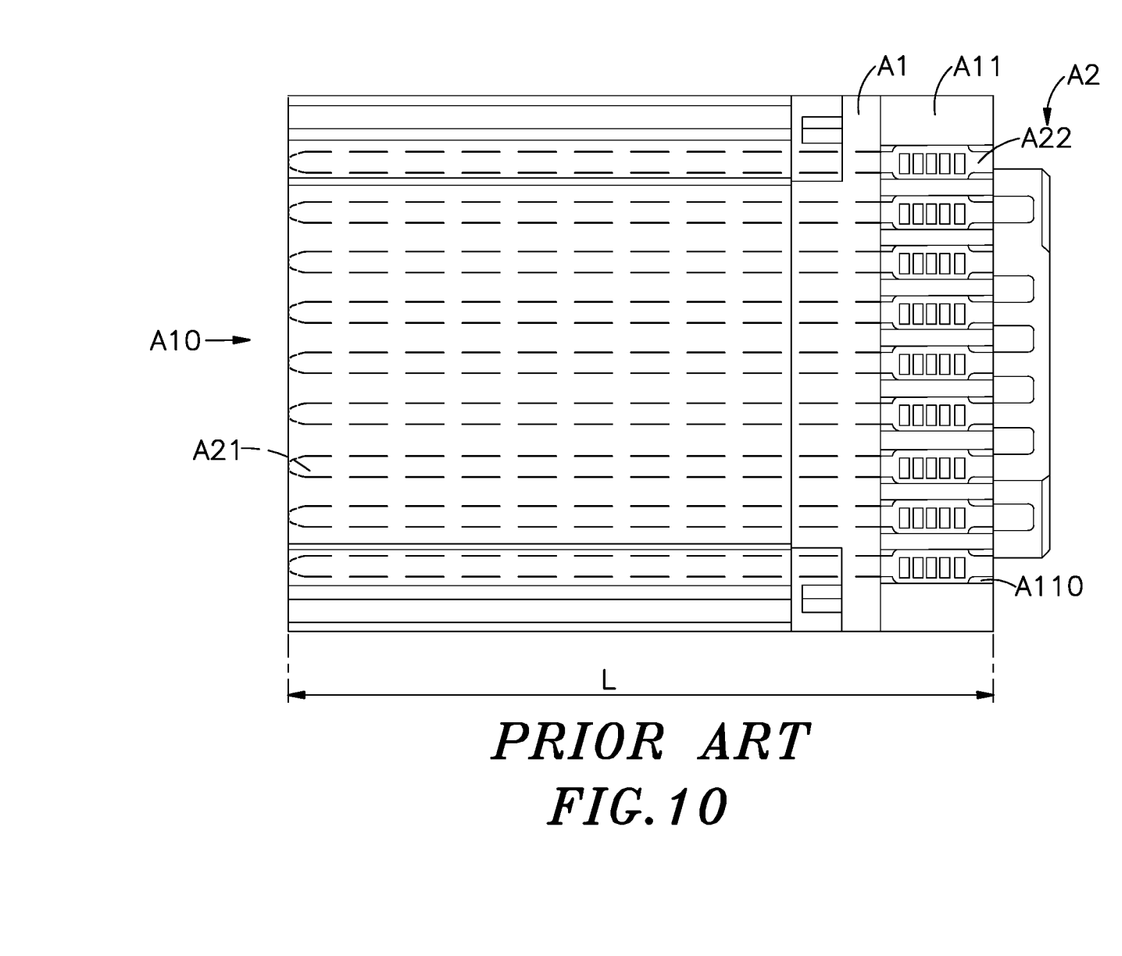
FIG. 10, is a top view of a conventional electric connector.

Furthermore, the conventional transmission cable for consumer electronic products usually use a plug connector to connect with a socket connector, and transmit various signals and power to a control circuit through a circuit board, so as to perform corresponding operation functions. Generally, the HDMI connector includes terminals arranged in upper and lower rows, and during the process of assembling the HDMI connector with a cable, the upper and lower rows of terminals are connected to the front metal contacts of the printed circuit board by soldering, and the front metal contacts are connected to the rear metal contacts of the printed circuit board through metal lines and are soldered to the plurality of core wires of the cable. Please refer to FIGS. 9 and 10. An insulating base A1 of a general HDMI connector A includes a terminal set A2 inserted therethrough and including plug ends A21 disposed at a side thereof, and the plug ends A21 are extended into the plug part A10 at a side of the insulating base A1, respectively. The terminal set A2 includes a soldering end A22 formed at other side thereof and extended to the terminal slots A110 on upper and lower surfaces of the connection base A11 on other side of the insulating base A1. The size of each plug end A21 of the terminal set A2 of the HDMI connector A is defined in the specification, and a certain length of each soldering end A22 is exposed out of the upper and lower surfaces of the connection base A11 to electrically connect to a cable. The length of the terminal set A2 of the general HDMI connector is 17.3 mm, and it is hard to reduce the length (L) of the insulating base A1. However, when the size of the HDMI connector is reduced and the transmission bandwidth is greatly increased, the high frequency signal transmission may be more seriously interfered because by the adjacent terminals are too close. In most terminal assembly process, the terminals are inserted into the insulative body. The structural design of terminals for insertion has the advantages of simple process and low defect rate, but this terminal occupies more space when being assembled with the insulating body, so the overall size of the electric connector cannot be effectively reduced; furthermore, during the assembly process, the terminal may be bent or deformed easily, and it causes that the terminal may exit or drop from the insulating body when the user plugs and unplugs the HDMI connector, so quality of the high-frequency signal transmission is affected.

Therefore, what is needed is to develop an electric connector to solve above-mentioned problems that it is hard to reduce the size of the conventional connector, and the terminal set may be bent or deformed easily during the manufacturing process to degrade the quality of signal transmission.

SUMMARY OF THE INVENTION

In order to solve aforementioned problems and drawbacks, the inventor develops the electric connector including a terminal set which has a smaller size, and is not easily deformed during the manufacturing and assembly process, and can be assembled with the insulating body easily.

An objective of the present invention is that the insulating body of the electric connector includes plurality of terminal slots formed on upper and lower sidewalls of the abutting chamber inside the abutting part, and the abutting part includes two arms extended from two opposite rear sides thereof in the same direction, and an accommodation space formed between the two arms, the terminal set includes conductive terminals disposed in upper and lower rows, the terminal holder integrally formed with the conductive terminals is combined between the two arms, the terminal set includes the conductive terminals which each has a predetermined length and smaller width, and include a contact part inserted through the terminal slot and into the abutting chamber, and a solder part disposed behind the contact part and exposed to the accommodation space, and having a length of lower than the length of each arm, and a terminal arm having a predetermined length and a smaller width, and formed between the contact part and the solder part; and, the terminal arm is configured to electrically connect the solder part to an abutting side of the signal transmission part and a transmission side disposed at other side of the signal transmission part, so that the purpose of reducing the size of the terminal set and facilitating to assemble the terminal set with the insulating body can be achieved, and the terminal set can be assembled in the accommodation space and the abutting chamber of the insulating body without being deformed easily; furthermore, the entire length of the conductive terminals of the terminal set and the insulating body can be reduced, thereby meeting the concept of designing lighter, thinner, shorter and smaller electronic product.

Another objective of the present invention is that the terminal set includes the conductive terminals having predetermined length and disposed in the upper and lower rows, and each conductive terminal includes a splint type solder part formed at a side thereof, and the signal transmission part is a circuit board combined in the accommodation space between the two arms, and the circuit board of the signal transmission part comprises abutting sides formed on upper and lower plate surface of a side thereof, and each abutting side comprises a plurality of first contacts electrically connected to the solder parts corresponding thereto, and the other side of the circuit board of the signal transmission part comprises the transmission side corresponding to the abutting side, and the transmission side comprises a plurality of second contacts, and a predetermined length of each of the upper and lower rows of conductive terminals of the terminal set is in a range of 9 mm to 10 mm; preferably, the predetermined length is 9.5 mm, and the length of the conductive terminal is lower than the length of the insulating body; and, the conductive terminal can include a solder-wire type solder part formed as a side thereof, and the signal transmission part is a transmission cable extend to the accommodation space formed between the two arms, and the transmission cable of the signal transmission part comprises abutting sides disposed on a side thereof, and each abutting side comprises a plurality of metal wire ends electrically connected to the solder part, each metal wire end is extended to other side of the transmission cable of the signal transmission part and is electrically connected to the predetermined output part, and the predetermined output part is a first connector, and the first connector is a HDMI electric connector or a USB electric connector; and, each of the upper and lower rows of the conductive terminals of the terminal set has a predetermined length in a range of 10.5 mm to 11.2 mm. Preferably, the predetermined length is 10.9 mm, and the length of the conductive terminal is lower than the length of the insulating body.

Another objective of the present invention is that the abutting part of the insulating body comprises a plurality of terminal slots formed on upper and lower side walls of the abutting chamber thereof, and among the terminal slots disposed the upper rows, the fifth and eleventh terminal slots are ground terminal slots, the first, the third, the seventh and the ninth terminal slots are differential signal pair terminal slots with wider ends, and the two adjacent differential signal pair terminal slots are in communication with each other, respectively; and, among the terminal slots disposed in the lower row, the second and eighth terminal slots are ground terminal slots, the fourth, the sixth, the tenth and the twelfth terminal slots are differential signal pair terminal slots with wider ends and n communication with each other, and the other terminal slots are the signal terminal slots; and, in the terminal set, the first and third differential signal pair terminals located in the upper row of are disposed in the first and third differential signal pair terminal slots in communication with each other, the seventh and ninth differential signal pair terminals disposed at the upper row are disposed in the seventh and ninth differential signal pair terminal slots in communication with each other, the fourth and the sixth differential signal pair terminals disposed in the lower row are disposed in the fourth and the sixth differential signal pair terminal slots in communication with each other, the tenth and twelfth differential signal pair terminals disposed in the lower row are disposed in the tenth and twelfth differential signal pair terminal slots in communication with each other, any two adjacent differential signal pair terminals are spaced apart by an appropriate interval to prevent from affecting and interfering with each other, so as to further prevent the crosstalk interference during signal transmission; and, in the terminal set, the thirteenth, the fifteenth, the seventeenth and the nineteenth conductive terminals disposed in the upper row and the fourteenth, sixteenth, and eighteenth conductive terminals disposed in the lower row are signal terminals and aligned to and inserted into the upper row of the thirteenth, the fifteenth, the tenth and the nineteenth signal terminal slots and the lower row of the fourteenth, the sixteenth, the eighteenth signal terminal slots on the abutting part of the insulating body.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Please refer to FIGS. 1 to 4, which show an elevational view, an exploded view, another exploded view when viewed from another angle, and a top sectional view, according to an electric connector of the present invention, respectively. As shown in FIGS. 1 to 4, the electric connector includes an insulating body 1, a terminal set 2 and a signal transmission part 3.

The insulating body 1 comprises an abutting part 11 which includes an abutting chamber 110 formed inside thereof and having a front opening, and the abutting chamber 110 is provided with a plurality of terminal slots 111 formed on upper and lower sidewalls thereof. The abutting part 11 includes two narrowing surface 112 downward obliquely extended from two opposite sides thereof to a bottom surface thereof, respectively; and, the abutting part 11 comprises two arms 12 extended from two opposite rear sides thereof in the same direction, and an accommodation space 120 formed between the two arms 12, and each arm 12 includes a guide slot 121 recessed on the inside wall thereof from back to front. The insulating body 1 includes a fixing slot 122 recessed between the two arms 12 and facing towards the abutting part 11. The fixing slot 122 is provided with a plurality of buckle grooves 123 formed on upper and lower sidewalls thereof, and the fixing slot 122 includes a plurality of channels in communication with the terminal slots 111, respectively.

The terminal set 2 includes conductive terminals 21 with predetermined length L2 and smaller width, and disposed in the upper and lower rows, respectively. In this embodiment, the upper and lower rows of the conductive terminals 21 are integrally formed with an upper base board 221 and a lower base board 222 of a terminal holder 22, respectively, by injection molding manner; however, in actual application, the upper and lower rows of the conductive terminals 21 can be combined with the upper base board 221 and the lower base board 222 by assembly manner, respectively. Each the conductive terminal 21 includes a contact part 214 formed on a front part thereof inserted out of the terminal holder 22, and a solder part 215 disposed behind the contact part 214 and inserted out of the terminal holder 22, and a terminal arm 216 having a predetermined length, a smaller width and formed between the contact part 214 and the solder part 215. The contact part 214 disposed on a side of the terminal arm 216 can be in a bent shape with smooth curve without perpendicular blind spot, so as to decrease resistance of each the conductive terminal 21 and smoothly transmit electrical signal through the conductive terminal 21. The upper base board 221 of the terminal holder 22 include a convex buckle 223 disposed on an upper side thereof, and the lower base board 222 of the terminal holder 22 includes the convex buckle 223 disposed on the lower side thereof.

The signal transmission part 3 includes an abutting side 31 formed on a side thereof and a transmission side 32 formed on the other side thereof. Preferably, the signal transmission part 3 can be a circuit board 301 or a transmission cable 302 capable of transmitting electrical signal.

In order to assemble the aforementioned components, the terminal set 2 is inserted into the accommodation space 120 between the two arms 12 on a side of the insulating body 1, the two opposite sides of the terminal holder 22 of the terminal set 2 can be pushed towards the fixing slot 122 along the two arms 12 and into the accommodation space 120, and the contact part 214 of each of the upper and lower rows of the conductive terminals 21 of the terminal set 2 can be inserted into the terminal slot 111 and extended into the abutting chamber 110, so that the terminal holder 22 can be engaged in the fixing slot 122, and the convex buckles 223 of the terminal holder 22 can be engaged in the buckle grooves 123 on the insulating body 1, respectively. The solder parts 215 of the upper and lower rows of the conductive terminals 21 of the terminal set 2 are exposed to the accommodation space 120 between the two arms 12. In an embodiment, the predetermined length L2 of each of the upper and lower rows of the conductive terminals 21 of the terminal set 2 can be in a range of 9 mm to 10 mm, and preferably, the predetermined length L2 can be 9.5 mm; furthermore, the length L2 of the conductive terminal 21 is lower than the length L1 of the insulating body 1, the length L4 of the solder part 215 is lower than the length L3 of each of the two arms 12, so as to facilitate to insert the terminal set 2 through the accommodation space 120 of the insulating body 1 and into the abutting chamber 110. The conductive terminal 21 is not easy to deform and can form firm combination, so as to achieve the effect of stopping, positioning and preventing from escaping, thereby preventing the terminal set 2 from moving or escaping from the insulating body 1 when the insulating body 1 is plugged in actual application. Furthermore, the reduction in the length of each of the plurality of conductive terminal 21 of the terminal set 2 and the length of the insulating body 1 can also meet the concept of designing lighter, thinner, shorter and smaller electronic product.

The abutting part 11 of the insulating body 1 includes the plurality of terminal slots 111 formed on upper and lower sidewalls of the abutting chamber 110 thereof, respectively. Among the ten terminal slots 111 disposed in the upper row, the fifth and eleventh pins are ground terminal slots 1111, and the first, the third, the seventh and the ninth pins are differential signal pair terminal slots 1112 with wider end and in communication with each other. Among the terminal slots 111 disposed in the lower row, the second and eighth pins are ground terminal slots 1111; and, the fourth, the sixth, the tenth and the twelfth pins are the differential signal pair terminal slots 1112 with wider ends and in communication with each. The other terminal slots 111 are signal terminal slots 1113.

Furthermore, the terminal set 2 comprises nineteen conductive terminals 21 disposed in the upper and lower rows and in horizontally misaligned arrangement. The ten conductive terminal 21 disposed in the upper row can be defined as, in the order from left to right, a first pin served as a TMDS Data2+ pin, a third pin served as a TMDS Data2− pin, a fifth pin served as a TMDS Data1 Shield pin, a seventh pin served as a TMDS Data0+ pin, a ninth pin served as a TMDS Data0− pin, an eleventh pin served as the TMDS Clock Shield pin, a thirteenth pin served as a CEC pin, a fifteenth pin served as a SCL pin, a seventeenth pin served as a DDC/CEC Ground pin, and a nineteenth pin served as a Hot Plug Detect pin; and, the nine conductive terminals 21 in the lower row are defined as, in the order from left to right, a second pin served as a TMDS Data2 Shield pin, a fourth pin served as a TMDS Data1+ pin, a sixth pin served as a TMDS Data1− pin, an eighth pin served as a TMDS Data0 Shield pin, a tenth pin served as a TMDS Clock+ pin, a twelfth pin served as a TMDS Clock− pin, a fourteenth pin served as a Reserved (N.C. on device) pin, a sixteenth pin served as a SDA pin, and an eighteenth pin served as a +5V Power pin. In the terminal set 2, the fifth and the eleventh conductive terminals 21 located in the upper row and the second and the eighth conductive terminals 21 located in the lower row are ground terminals 211 and are inserted in the upper row of the fifth and the eleventh ground terminal slots 1111 and the lower row of the second and the eighth ground terminal slots 1111, respectively. In the terminal set 2, the first, the third, the seventh and the ninth conductive terminal 21 located in the upper row and the fourth, the sixth, the tenth and the twelfth conductive terminals 21 in the lower row are differential signal pair terminals 212 and are inserted into the upper row of the first, the third, the seventh, the ninth differential signal pair terminal slots 1112 and the lower row of the fourth, the sixth, the tenth and the twelfth differential signal pair terminal slots 1112 of the abutting part 11 of the insulating body 1, respectively. In the terminal set 2, the first and third differential signal pair terminals 212 located in the upper row are disposed in the first and the third differential signal pair terminal slots 1112 in communication with each other; and, the upper row of the seventh and the ninth differential signal pair terminals 212 are disposed in the seventh and the ninth differential signal pair terminal slots 1112 in communication with each other; and, the lower row of the fourth and the sixth differential signal pair terminals 212 are disposed in the fourth and the sixth differential signal pair terminal slots 1112 in communication with each other; and, the lower row of the tenth and twelfth differential signal pair terminals 212 are disposed in the tenth and twelfth differential signal pair terminal slots 1112 in communication with each other. Any two adjacent differential signal pair terminals 212 are spaced apart by an appropriate interval and do not affect and interference with each other, so as to prevent the crosstalk interference during signal transmission. The thirteenth, the fifteenth, the seventeenth and the nineteenth conductive terminal 21 of the terminal set 2 located in the upper row, and the fourteenth, the sixteenth and the eighteenth conductive terminals 21 of the terminal set 2 located in the lower row are signal terminals 213 and aligned to and inserted into the upper row of the thirteenth, the fifteenth, the tenth and the nineteenth signal terminal slots 1113 and the lower row of the fourteenth, the sixteenth and the eighteenth signal terminal slots 1113 on the abutting part 11 of the insulating body 1, respectively.

Figure 2:
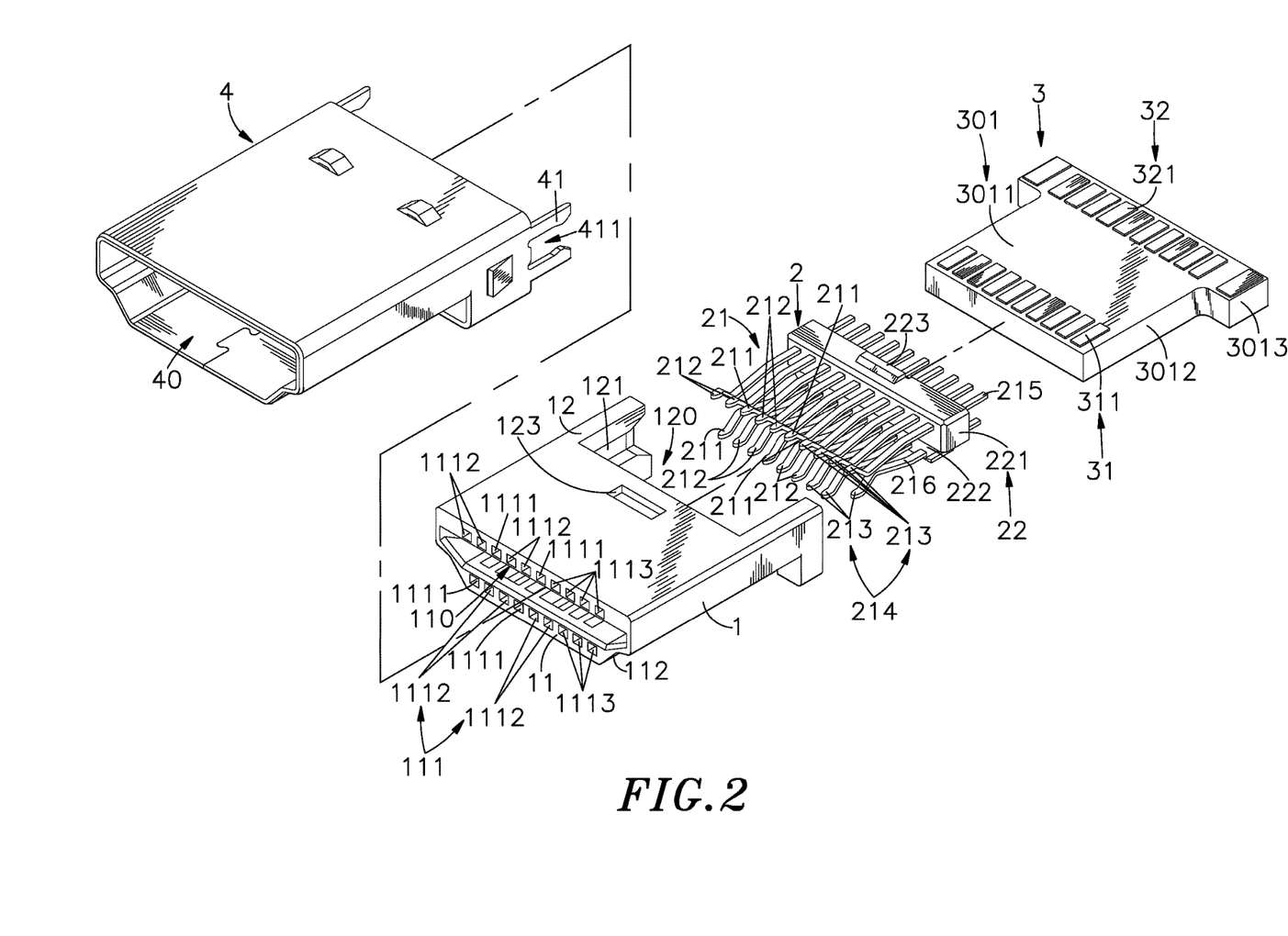
FIG. 2 is an exploded view of an electric connector of the present invention.
Figure 3:
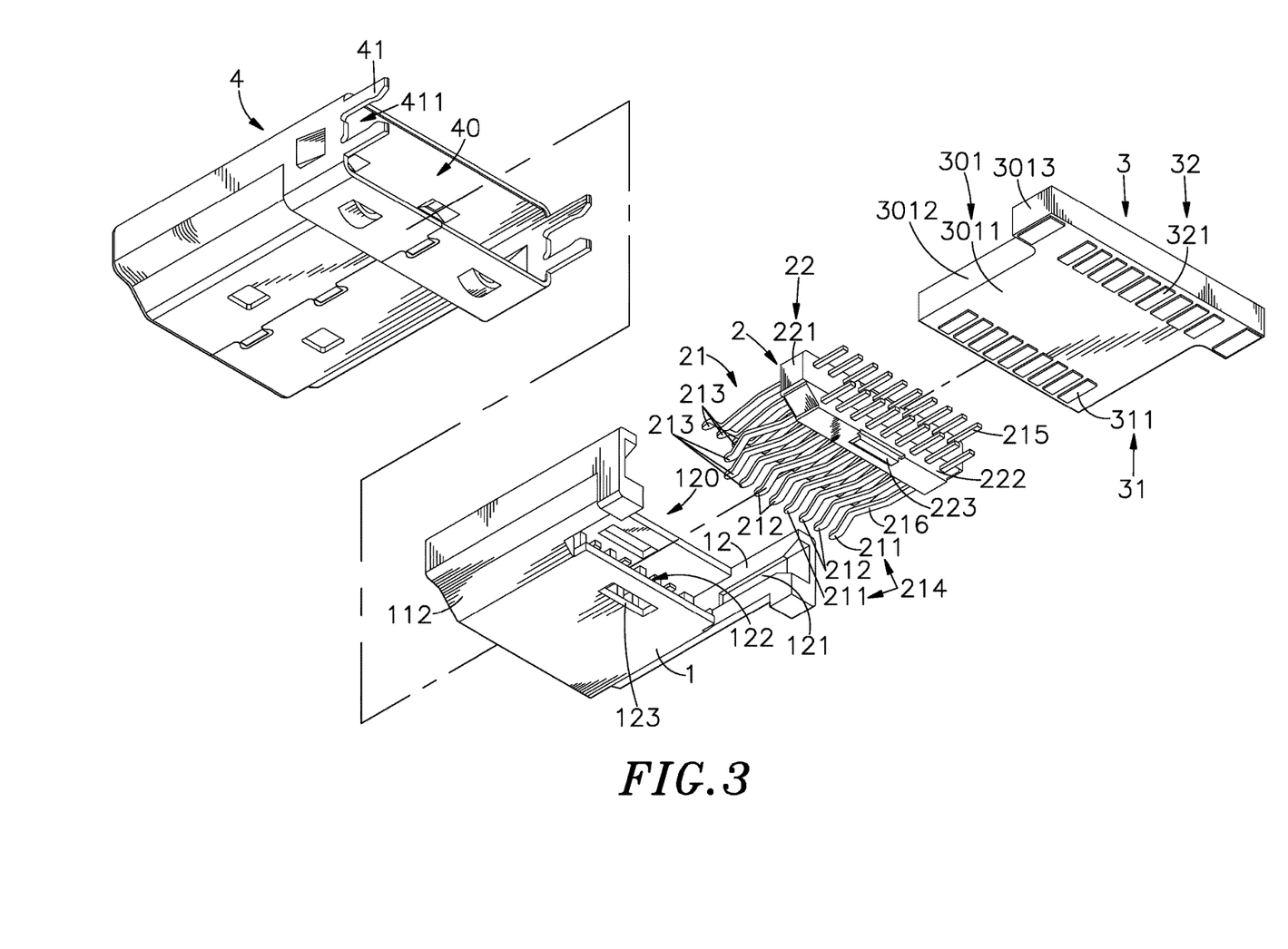
FIG. 3 is an exploded view of an electric connector of the present invention, when viewed from another angle.
Figure 4:
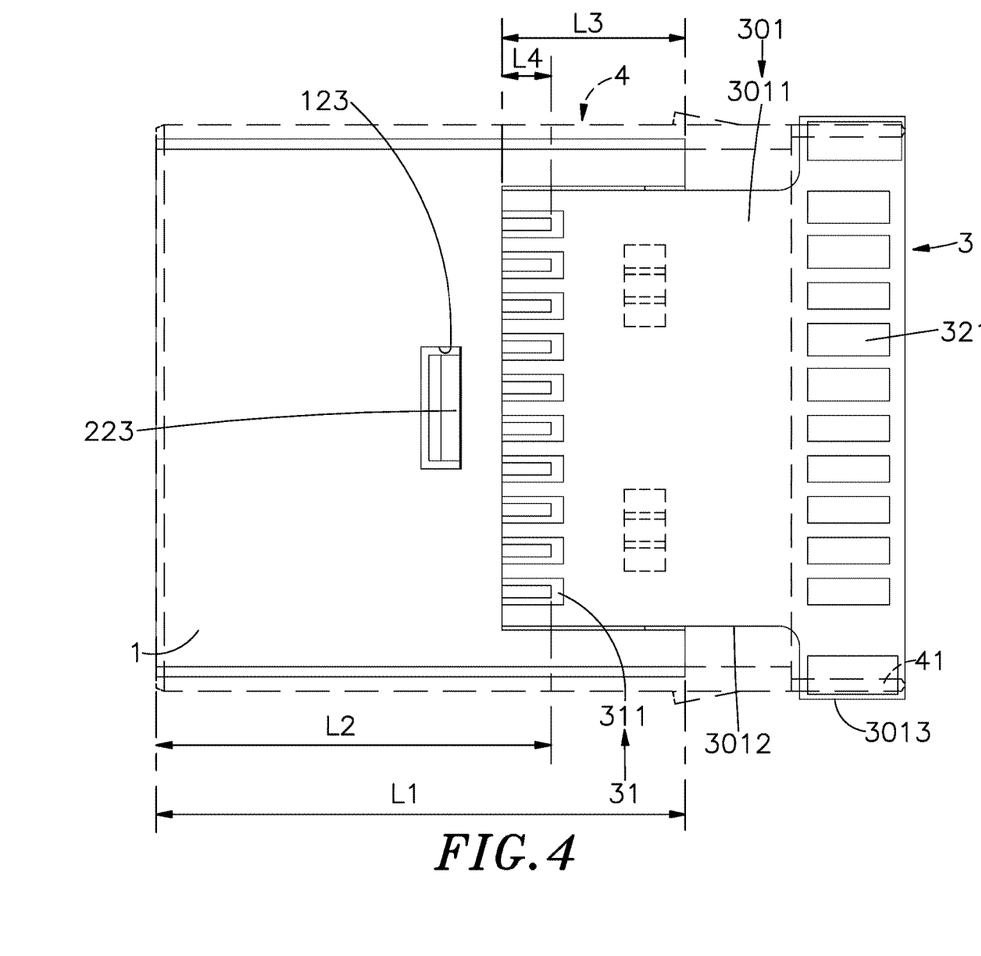
FIG. 4 is a top sectional view of an electric connector of the present invention.
Figure 5:
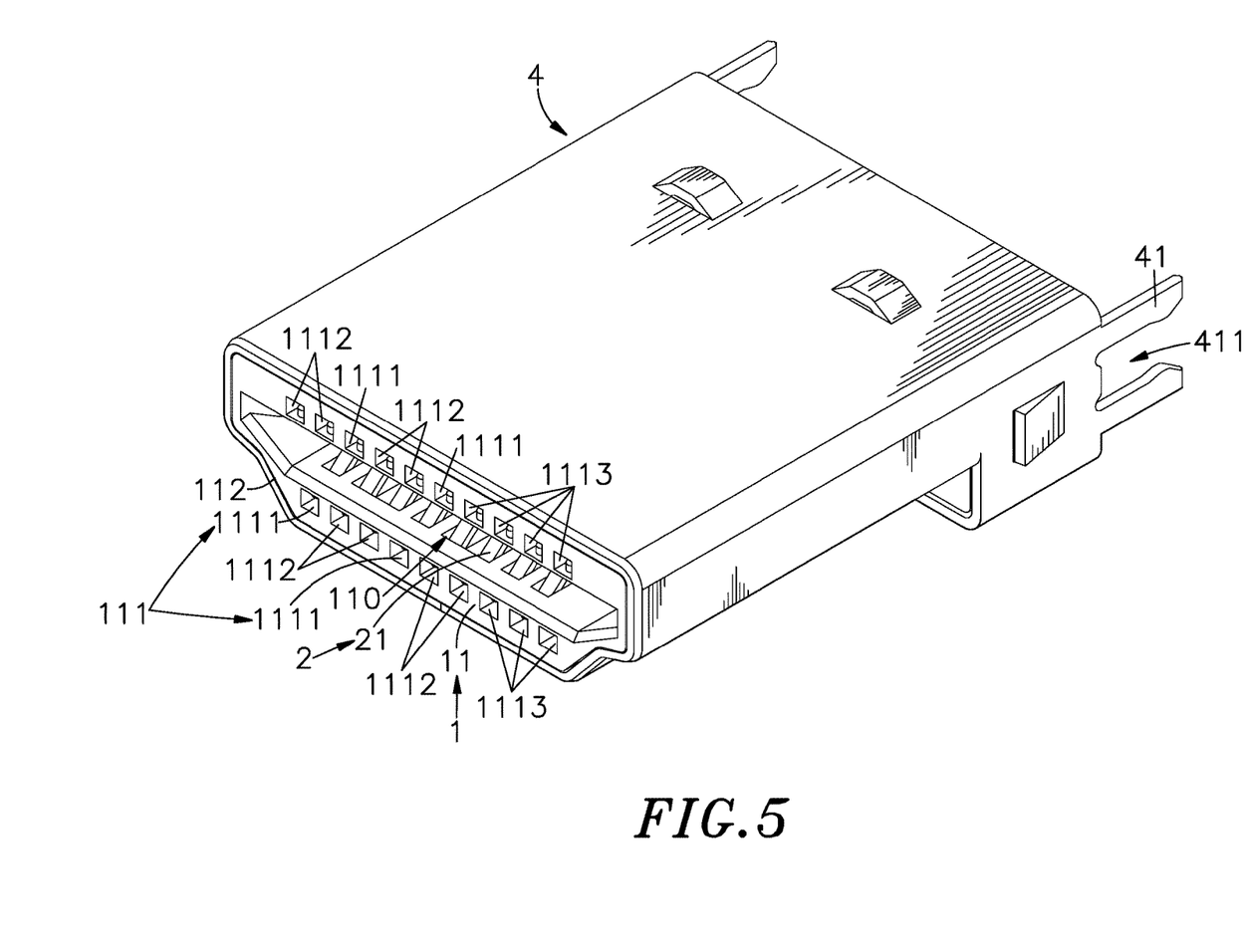
FIG. 5 is an elevational view of an electric connector of another embodiment of the present invention.
Figure 6:
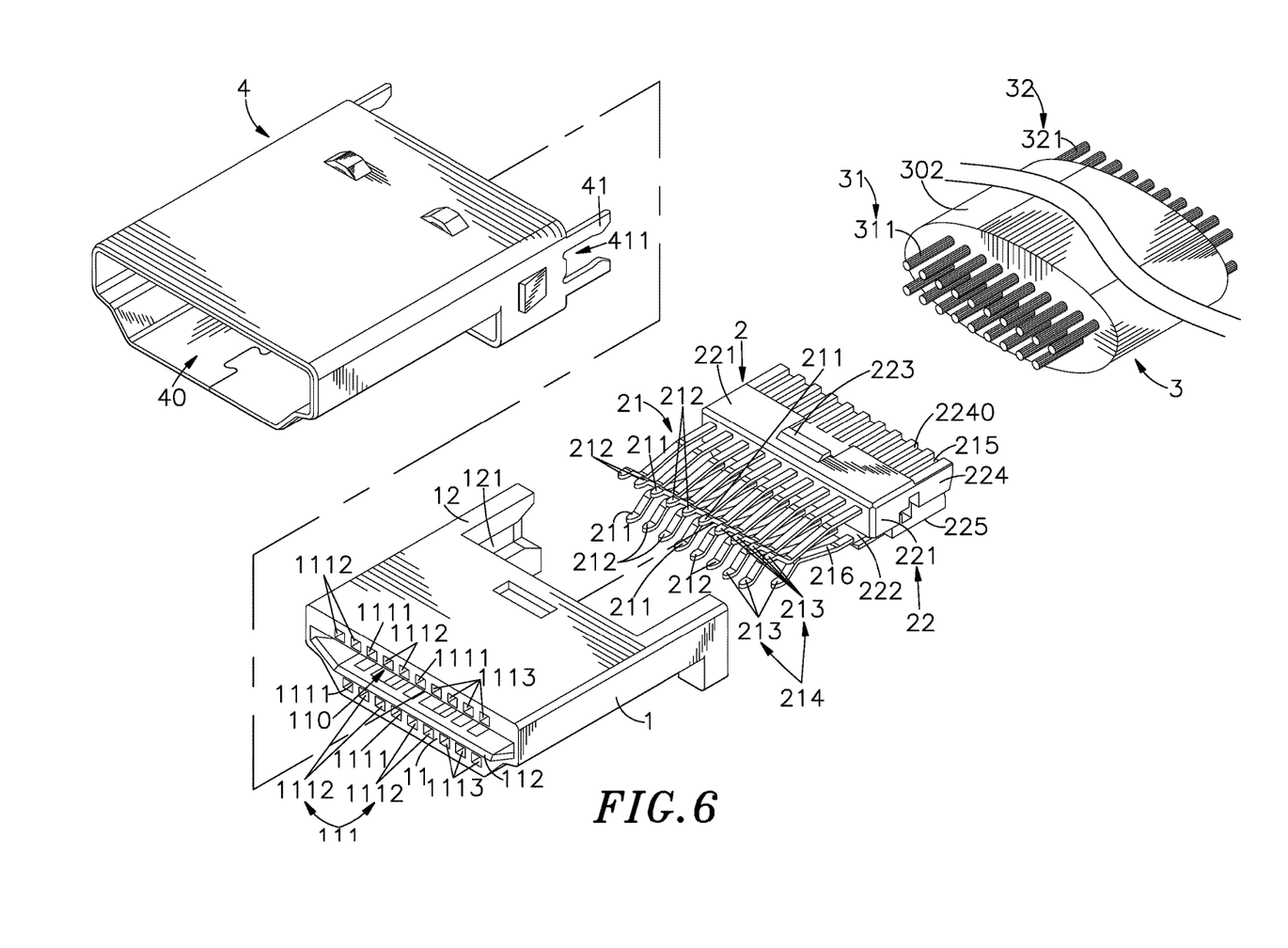
FIG. 6 is an exploded view of an electric connector of another embodiment of the present invention.
Figure 7:
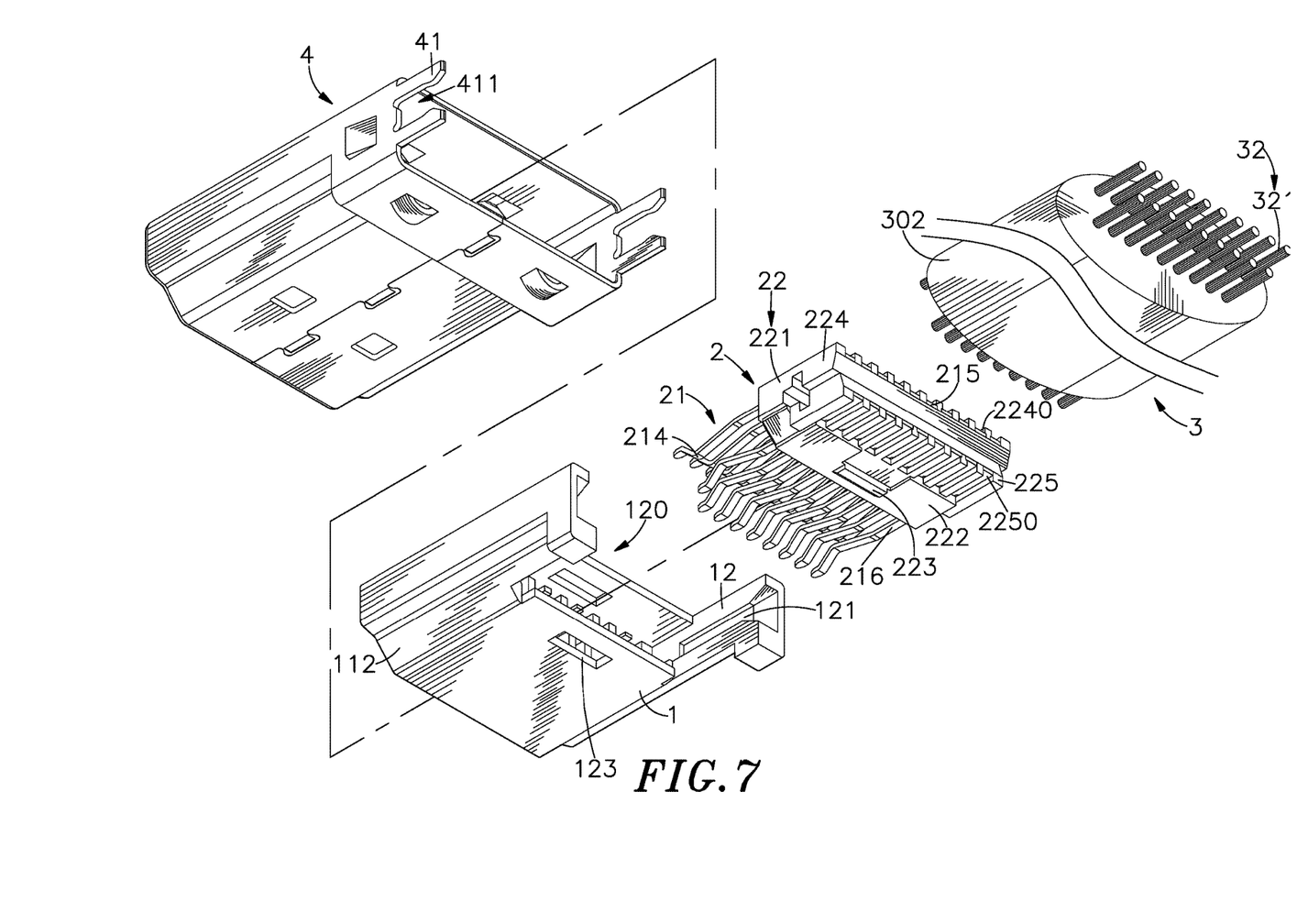
FIG. 7 is an exploded view of an electric connector of another embodiment of the present invention, when viewed from another angle.
Figure 8:
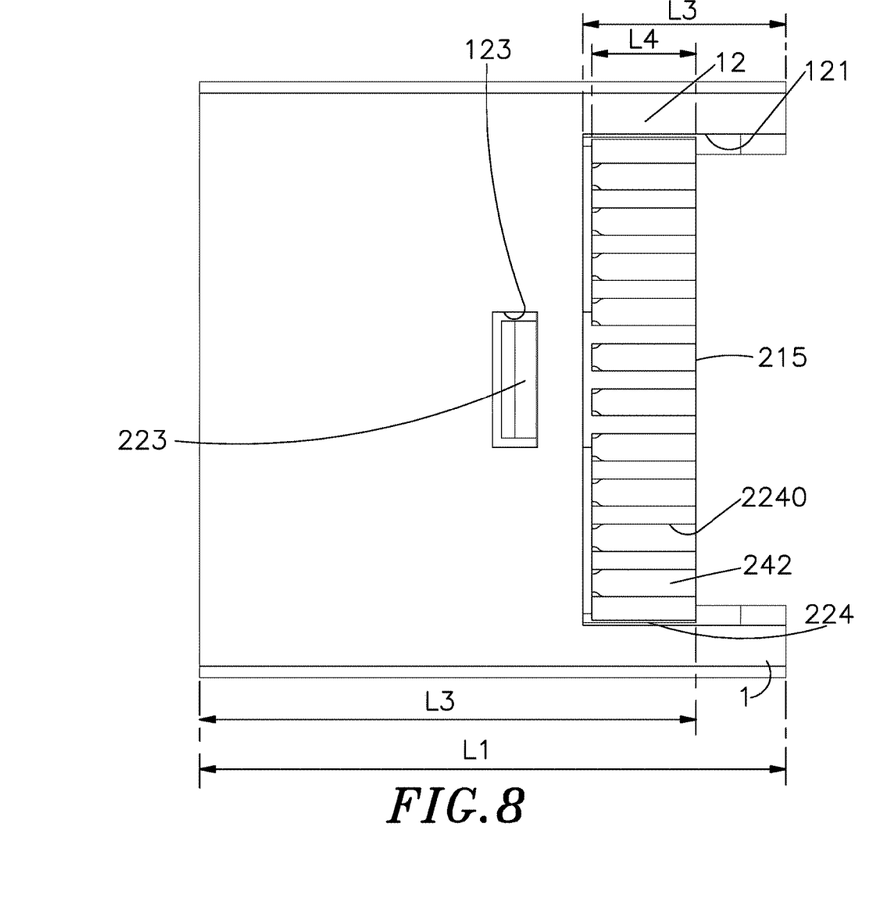
FIG. 8 is a top sectional view of an electric connector of another embodiment of the present invention.

Furthermore, in a condition that the signal transmission part 3 is the circuit board 301, the circuit board 301 includes upper and lower plate surfaces 3011, and the upper and lower plate surface 3011 are formed with abutting side 31 and the transmission side 32 at front and rear sides thereof, respectively. A plurality of first contacts 311 are disposed on the abutting side 31 at the sides of the upper and lower plate surfaces 3011, and a plurality of second contacts 321 are disposed on the transmission side 32 at the other sides of the upper and lower plate surface 3011, and the first contacts 311 are electrically connected to the second contacts 321 corresponding thereto, through the predetermined circuit on the circuit board 301, respectively, so as to form electrical conduction paths. Furthermore, the circuit board 301 includes board laterals 3012 formed on two lateral sides of the abutting side 31 and the transmission side 32 thereof, respectively, and abutting shoulder parts 3013 extended outwardly from the lateral sides of the two board laterals 3012 at two outer sides of the transmission side 32, and the abutting shoulder part 3013 has an increasing width.

Each the solder part 215 of the terminal set 2 disposed in the accommodation space 120 between the two arms 12 of the insulating body 1 is a splint type terminal solder part 215, and the circuit board 301 of the signal transmission part 3 can be inserted into the accommodation space 120 through the board laterals 3012 along the guide slot 121 on inner sides of the two arms 12, the front end of the circuit board 301 can be abutted with the lateral side of the terminal holder 22 of the terminal set 2, the solder parts 215 on sides of the upper and lower rows of the conductive terminals 21 are aligned to and clamped on the first contacts 311 on the abutting side 31, respectively, so that the solder parts 215 can be soldered on the first contacts 311 on the abutting side 31 by SMT soldering manner, to form electrical conduction. After the circuit board 301 is inserted along the guide slot 121 of the two arm 12 and the abutting side 31 of the upper and lower plate surfaces 3011 can be soldered with the solder parts 215 of the terminal set 2 for positioning, so that about half length of the circuit board 301 can be firmly combined in the insulating body 1, thereby significantly shortening size and length L1 of entire insulating body 1, and preventing the circuit board 301 from being loosened or separating from the insulating body 1, and further achieving effect of stable structure, and easy assembly and positioning, and lower cost; furthermore, the signal transmission distance between the conductive terminals 21 and the circuit board 301 can be shortened; and, at the same time, and when each the conductive terminal 21 becomes shorter and each the contact part 214 has a more smooth curve, the resistance of each the conductive terminal 21 can be decreased, so as to effectively improve high frequency signal transmission speed, and also meet the requirement of HDMI 2.1 specification with 48 Gbps of transmission bandwidth.

Figure 1:
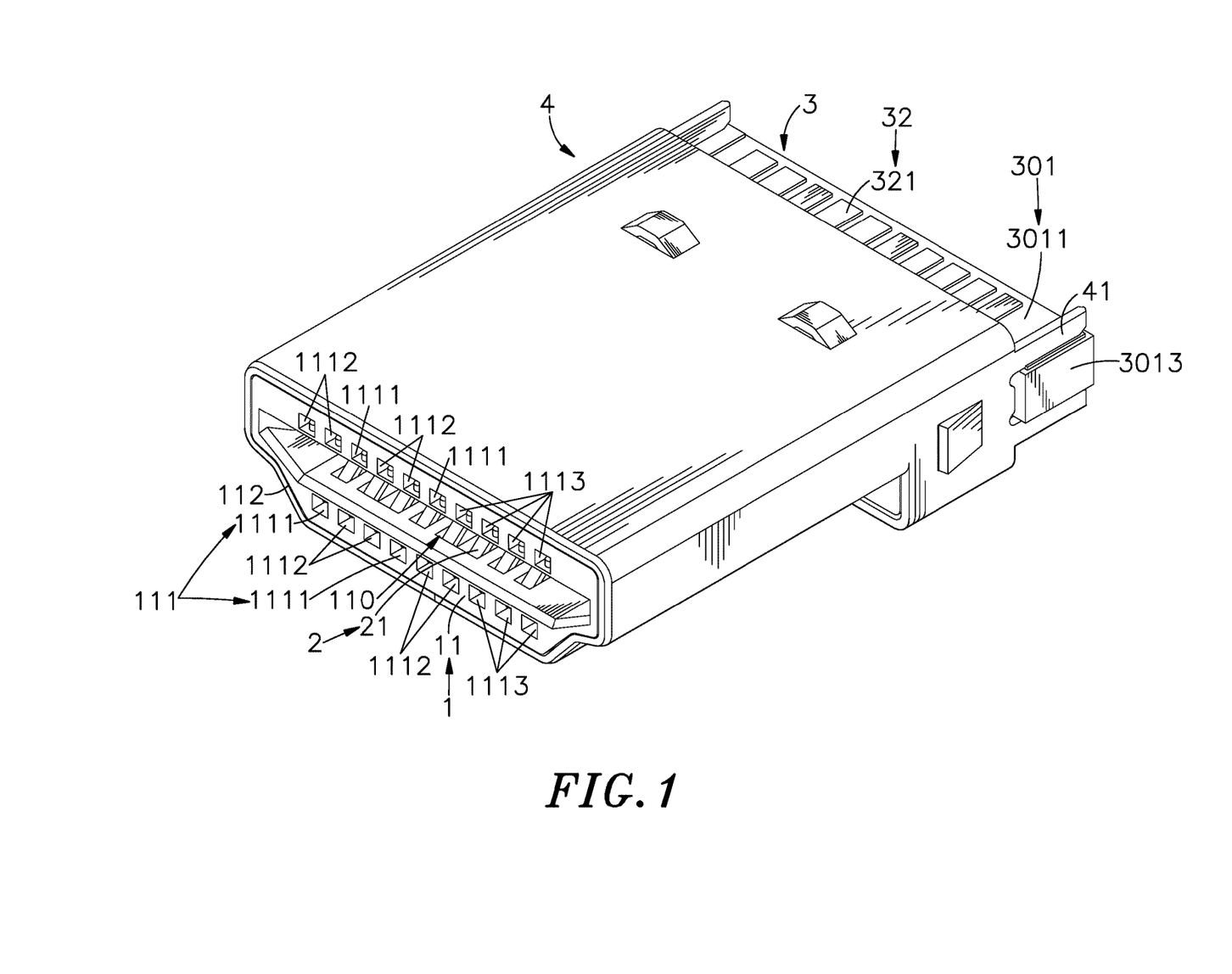
FIG. 1 is an elevational view of an electric connector of the present invention.

Furthermore, the insulating body 1 is covered and positioned by a shielding housing 4, and the insulating body 1 with the terminal set 2 and the circuit board 3 can be inserted into the rear opening of the shielding housing 4 to engage in a positioning space 40. After the insulating body 1 is inserted and positioned, the abutting shoulder parts 3013 at the two opposite rear sides of the circuit board 301 can be engaged in clamping slots 411 between two ground pins 41, respectively, and the plurality of second contacts 321 on the transmission side 32 of the circuit board 301 can be exposed to rear portion of the shielding housing 4, and the two adjacent ground pins 41 are abutted with and soldered with the metal contacts of the corresponding second contacts 321 for grounding, respectively, by using SMT manner, to form electrical connection. Besides the metal contacts, the plurality of second contacts 321 on the transmission side 32 can be also connected to a transmission cable, and an insulating outer shell can be combined on the outside of the shielding housing 4 for passing the transmission cable. After above-mentioned assembly process is completed, a plug connector or a wire-end connector compliant with HDMI 2.1 specification can be formed.

In the circuit board 301 of the signal transmission part 3, the second contacts 321 at outermost side of the transmission side 32 on the abutting shoulder part 3013 can be used for grounding, and after the shielding housing 4 covers and positions the outsides of the insulating body 1, the ground pins 41 can be soldered and fixed on the second contacts 321 to form a common ground, respectively, to improve conductive path and density for grounding, and also reduce the EMI and crosstalk interference occurred during high frequency signal transmission; however, the present invention is not limited to above example, for example, the shielding housing 4 can be omitted according to actual application or different purpose. It should be noted that various equivalent structural changes, alternations or modifications based on the descriptions and figures of present disclosure are all consequently viewed as being embraced by the spirit and the scope of the present disclosure set forth in the claims.

Please refer to FIGS. 5 to 8, which show an elevational view, an exploded view, another exploded view from another angle, and a top sectional view of another embodiment of the present invention. The terminal set 2 includes the conductive terminal 21 located in upper and lower rows, respectively. In this embodiment, the upper and lower rows of the conductive terminals 21 are integrally formed with the upper base board 221 and the lower base board 222 of the terminal holder 22 by injection molding manner, respectively, and the upper base board 221 includes the convex buckle 223 formed on upper side thereof, and the lower base board 222 includes the convex buckle 223 formed on lower side thereof. The upper base board 221 includes an upper solder member 224 extended outwardly form a side thereof, and the lower base board 222 includes a lower solder member 225 extended outwardly from a side thereof. The upper solder member 224 include a plurality of upper terminal channels 2240, and the lower solder member 225 includes a plurality of lower terminal channels 2250; however, in actual application, the upper and lower rows of the conductive terminals 21 can be combined with the upper base board 221 and the lower base board 222 by assembly manner, respectively. Each the conductive terminal 21 includes the contact part 214 formed on a front part thereof and inserted out of the terminal holder 22, and the solder part 215 disposed behind the contact part 214 and inserted through the upper solder member 224 and the lower solder member 225 on a side of the upper base board 221 and the lower base board 222 of the terminal holder 22. The solder parts 215 are extended into the upper terminal channels 2240 of the upper solder member 224 and the lower terminal channels 2250 of the lower solder member 225, respectively.

During assembly process, the terminal set 2 is inserted into the accommodation space 120 between the two arms 12 on a side of the insulating body 1, the two opposite sides of the terminal holder 22 of the terminal set 2 can be inserted towards the fixing slot 122 along the two arms 12, and into the accommodation space 120. In the terminal set 2, the fifth and the eleventh conductive terminal 21 located in the upper row, and the second and the eighth conductive terminal 21 located in the lower row are the ground terminals 211 and inserted into the fifth and the eleventh ground terminal slots 1111 in the upper row and the second and the eighth ground terminal slots 1111 in the lower row of the abutting part 11 of the insulating body 1, respectively; and, in the terminal set 2, the first, the third, the seventh and the ninth conductive terminals 21 located in the upper row, and the fourth, the sixth, the tenth and the twelfth conductive terminals 21 located in the lower row are the differential signal pair terminals 212 and inserted into the upper row of the first, the third, the seventh and the ninth differential signal pair terminal slots 1112, and the lower row of the fourth, the sixth, the tenth, and the twelfth differential signal pair terminal slots 1112 of the terminal slots 111 of the insulating body 1, respectively; and, in the terminal set 2, the first and third differential signal pair terminals 212 located in the upper row are disposed in the first and the third differential signal pair terminal slots 1112 in communication with each other, the seventh and the ninth differential signal pair terminals 212 located in the upper row are disposed in the seventh and the ninth differential signal pair terminal slots 1112 in communication with each other, the fourth and the sixth differential signal pair terminals 212 located in the lower row are disposed in the fourth and the sixth differential signal pair terminal slots 1112 in communication with each other, the tenth and twelfth differential signal pair terminal 212 located in the lower row are disposed in the tenth and twelfth differential signal pair terminal slots 1112 in communication with each other, any two adjacent differential signal pair terminals 212 are spaced apart by an appropriate interval and do not affect and interference to each other, so as to prevent the crosstalk interference during signal transmission. The thirteenth, the fifteenth, the seventeenth and the nineteenth conductive terminal 21 of the terminal set 2 located in the upper row, and the fourteenth, the sixteenth and the eighteenth conductive terminals 21 of the terminal set 2 located in the lower row are the signal terminals 213 and aligned and inserted into the upper row of the thirteenth, the fifteenth, the tenth and the nineteenth signal terminal slots 1113 and the lower row of the fourteenth, the sixteenth and the eighteenth signal terminal slots 1113 on the abutting part 11 of the insulating body 1, respectively. The contact part 214 at the front portion of each the conductive terminal 21 is inserted into the terminal slot 111 corresponding thereto and extended into the abutting chamber 110. After the terminal holder 22 is engaged in the fixing slot 122, the convex buckle 223 of the terminal holder 22 can be engaged in the buckle groove 123 on the insulating body 1, and the upper solder member 224 and the lower solder member 225 on a side of the upper base board 221 and the lower base board 222 of the terminal holder 22 can be exposed to the accommodation space 120 between the two arms 12; at the same time, the solder parts 215 disposed in the upper terminal channels 2240 and the lower terminal channels 2250 can also be exposed to the accommodation space 120 between the two arms 12.

The predetermined length L3 of each of the upper and lower rows of the conductive terminals 21 of the terminal set 2 can be in a range of 10.5 mm to 11.2 mm, and preferably, the predetermined length L2 can be 10.9 mm, and the length L3 of the conductive terminal 21 is lower than the length L1 of the insulating body 1. Each the conductive terminal 21 includes the solder-wire type solder part 215 formed on a side thereof, and the length L4 of the solder-wire type solder part 215 is lower than the length L3 of each of the two arms 12, so as to facilitate to insert the terminal set 2 through the accommodation space 120 of the insulating body 1 and into the abutting chamber 110 to form firm combination, thereby achieving the effect of stopping, positioning and preventing the terminal set 2 from moving, dropping or escaping from the insulating body 1 when the insulating body 1 is plugged; furthermore, the reduced length of each the plurality of conductive terminals 21 of the terminal set 2 and the reduced length L1 of the insulating body 1 can also meet the concept of designing lighter, thinner, shorter and smaller electronic product.

When the signal transmission part 3 is the transmission cable 302, the transmission cable 302 is extended to the accommodation space 120 formed between the two arms 12, and the transmission cable 302 of the signal transmission part 3 comprises the abutting side 31 disposed on a side thereof, and the abutting side 31 includes a plurality of metal wire ends 3021 configured to electrically connect to the solder-wire type solder parts 215, so as to shorten the signal transmission distance between the conductive terminals 21 and the transmission cable 302, and further improve high-frequency signal transmission speed. Each the metal wire end 3021 can be extended to the other side of the transmission cable 302 of the signal transmission part 3 to form the transmission side 32 which is configured to electrically connect to a predetermined output part. In an embodiment, the predetermined output part can be a HDMI electric connector or a USB electric connector. According to above-mentioned structural design, the size and length of the entire insulating body 1 can be significantly shortened, and it can prevent the terminal set 2 from being loosened or separating from the insulating body 1, thereby achieving the effect of stable structure and easy assembly and positioning, and lower cost; and, furthermore, when each the conductive terminal 21 becomes shorter and each the contact part 214 has a more smooth curve, resistance of each the conductive terminal 21 can be decreased, so as to effectively improve high frequency signal transmission speed between the conductive terminals 21 and the circuit board 301, and also meet the requirement of HDMI 2.1 specification with 48 Gbps of transmission bandwidth.

The main concept of the present invention is that the abutting part 11 of the insulating body 1 includes the two arms 12 extended from the two opposite rear sides thereof in the same direction, respectively, and the terminal holder 22 formed integrally with the upper and lower rows of the conductive terminals 21 of the terminal set 2 is combined and assembled between the two arms 12, and the conductive terminal 21 can has a smaller width and the entire length thereof is lower than the length of the insulating body 1, and the solder part 215 on a side of each the conductive terminal 21 can be extended to the accommodation space 120 between the two arms 12, and the length of the solder part 215 is lower than the length of each of the two arms 12. In order to assemble the terminal set 2, the terminal set 2 can be disposed in the insulating body 1 with one try through the terminal holder 22, and the contact parts 214 at the front portions of the conductive terminals 21 can be inserted into the terminal slots 111 corresponding thereto on the abutting part 11, respectively, and the solder parts 215 of the upper and lower rows of the conductive terminals 21 disposed in the accommodation space 120 between the two arms 12 can be electrically connected to the signal transmission part 3, so as to shorten the signal transmission distance between the conductive terminals 21 and the signal transmission part 3, and improve high frequency signal transmission speed between the conductive terminal 21 and the circuit board 301, and also meet the requirement of HDMI 2.1 specification with 48 Gbps of transmission bandwidth; furthermore, the reduced length of each the conductive terminals 21 of the terminal set 2 and the reduced length of the insulating body 1 can also meet the concept of designing lighter, thinner, shorter and smaller electronic product, to, achieve the effect of stable structure, easy assembly and lower cost.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An electric connector, comprising:
   an insulating body comprising an abutting part, and the abutting part comprising an abutting chamber formed inside thereof, and the abutting chamber provided with a plurality of terminal slots formed on upper and lower sidewalls thereof, wherein the abutting part comprises two arms extended from two opposite rear sides thereof in the same direction, and an accommodation space formed between the two arms;
   a terminal set comprising upper and lower rows of conductive terminals with the predetermined lengths and smaller widths, and a terminal holder formed integrally with the upper and lower rows of the conductive terminals, and combined between the two arms, wherein the each of upper and lower rows of the conductive terminals comprises a contact part, a solder part formed behind the contact part thereof and exposed to the accommodation space between the two arms, and a terminal arm comprising a predetermined length and a smaller width, and formed between the contact part and the solder part thereof, wherein the contact parts are inserted through the terminal slots corresponding thereto and into the abutting chamber, respectively, and a length of each of the plurality of conductive terminals is lower than a length of the insulating body, and a length of the solder part of each of the plurality of conductive terminals is lower than a length of each of the two arms; and
   a signal transmission part electrically connected to the solder parts of the terminal set, and comprising an abutting side electrically connected to the solder parts, and a transmission side formed behind the abutting side and configured to transmit electrical signal to an external device.

2. The electric connector according to claim 1, wherein the abutting part of the insulating body comprises two narrowing surfaces downward obliquely extended from two opposite sides thereof to a bottom surface thereof, respectively, and a fixing slot recessed between the two arms and facing towards the abutting part, wherein the fixing slot is provided with a plurality of buckle grooves formed on upper and lower sidewalls thereof, respectively, and the fixing slot comprises a plurality of channels in communication with the terminal slots corresponding thereto, respectively, and the terminal holder of the terminal set is engaged in the fixing slot, and the terminal holder comprises convex buckles disposed on upper and lower sides thereof and configured to clasp in the buckle grooves, respectively.

3. The electric connector according to claim 2, wherein the terminal set comprises nineteen conductive terminal disposed in the upper and lower rows and in horizontally misaligned arrangement, to assemble a plug connector compliant with the HDMI2.1 specification, and the upper and lower rows of the conductive terminals are integrally formed with an upper base board and a lower base board of the terminal holder formed by injection molding manner, respectively.

4. The electric connector according to claim 1, wherein the terminal set comprises the upper and lower rows of the conductive terminals with predetermined lengths, and each of the upper and lower rows of the conductive terminals comprises the splint-type solder part formed at a side thereof, and the signal transmission part is a circuit board combined in the accommodation space between the two arms, and the circuit board comprises the abutting side formed on sides of upper and lower plate surface thereof, and the abutting side comprises a plurality of first contacts electrically connected to the solder parts, and the circuit board comprises the transmission side formed on other side thereof and corresponding to the abutting side, and the transmission side comprises a plurality of second contacts.

5. The electric connector according to claim 4, wherein each of the upper and lower rows the conductive terminals has a predetermined length in a range of 9 mm to 10 mm, preferably, the predetermined length is 9.5 mm.

6. The electric connector according to claim 4, wherein the two inner walls of the two arms of the insulating body comprises guide slots reassessed thereon from back to front, respectively, and the circuit board comprises board laterals formed on sides of the plate surface thereof and configured to insert into the accommodation space along the guide slots, so that the solder parts of the upper and lower rows of the conductive terminals are aligned to the plurality of first contacts on the abutting side of the circuit board, respectively.

7. The electric connector according to claim 1, wherein the terminal set comprises the upper and lower rows of the conductive terminals with predetermined lengths, and the terminal holder formed with the upper row of the conductive terminals and the lower row of the conductive terminals of the terminal set comprises an upper base board comprising an upper solder member on a side thereof, and a lower base board comprising a lower solder member, and the upper solder member and the lower solder member are exposed to the accommodation space between the two arms, and the upper solder member comprises a plurality of upper terminal channels formed thereon and the lower solder member comprises a plurality of lower terminal channels formed thereon, and the plurality of upper terminal channels and the plurality of lower terminal channels are configured for insertion of the solder parts of the plurality of conductive terminals, and the solder parts disposed on the upper solder member and the lower solder member are formed as solder-wire type, and the signal transmission part is a transmission cable extended to the accommodation space between the two arms, and the transmission cable comprises the abutting side disposed on a side thereof, and the abutting side comprises a plurality of metal wire ends electrically connected to the solder-wire type solder parts, and the metal wire ends are extended to the other side of the transmission cable to form a transmission side electrically connected to a predetermined output part, and the predetermined output part is a HDMI electric connector or a USB electric connector.

8. The electric connector according to claim 7, wherein each of the upper and lower rows of the conductive terminals comprises a predetermined length in a range of 10.5 mm to 11.2 mm, preferably, the predetermined length is 10.9 mm.

9. The electric connector according to claim 1, wherein the abutting part of the insulating body comprises the plurality of terminal slots formed on upper and lower side walls of the abutting chamber thereof, and among the ten terminal slots located in an upper row, the fifth and the eleventh pins are ground terminal slots, the first, the third, the seventh and the ninth pins are differential signal pair terminal slots with wider end and in communication with each other, and among the terminal slots located in a lower row, the second and the eighth pins are the ground terminal slots, the fourth, the sixth, the tenth and the twelfth pins are the differential signal pair terminal slots with wider ends and in communication with each other, and the other terminal slot are signal terminal slots;

wherein the terminal set comprises the upper row of the first and the third differential signal pair terminals disposed in the first and the third differential signal pair terminal slots in communication with each other, the upper row of the seventh and the ninth differential signal pair terminals disposed in the seventh and ninth differential signal pair terminal slots in communication with each other, the lower row of the fourth and sixth differential signal pair terminals disposed in the fourth and the sixth differential signal pair terminal slots in communication with each other, the lower row of the tenth and the twelfth differential signal pair terminals disposed in the tenth and the twelfth differential signal pair terminal slots in communication with each other, and any two adjacent differential signal pair terminals are spaced apart by an appropriate interval, and the terminal set comprises the upper row of the thirteenth, the fifteenth, the seventeenth and the nineteenth conductive terminals and the lower row of the fourteenth, the sixteenth, and the eighteenth conductive terminals are signal terminals and aligned to and inserted into the upper row of the thirteenth, the fifteenth, the tenth and the nineteenth signal terminal slots and the lower row of the fourteenth, the sixteenth, and the eighteenth signal terminal slots on the abutting part of the insulating body, respectively.

10. The electric connector according to claim 1, further comprising a shielding housing configured to cover and position the insulating body, wherein the shielding housing comprises a positioning space formed inside thereof, and front and rear sides of the positioning space are in communication with each other, and the transmission side of the signal transmission part is exposed out of a rear side of the shielding housing and configured to connect to a circuit board, a transmission cable or other electric connector, and the shielding housing comprises a plurality of ground pins longitudinally disposed on two opposite sides of a rear opening of the positioning space and extended outwardly, and clamping slots formed between any two adjacent ground pins of the plurality of ground pins and configured for engagement with abutting shoulder parts, and the ground pins are electrically connected to second contacts corresponding thereto on the circuit board to form a common ground, respectively.

* * * * *